United States Patent Office 3,311,604
Patented Mar. 28, 1967

3,311,604
PROCESS FOR POLYMERIZING ISOPRENE WITH A CATALYST CONSISTING OF TITANIUM TETRACHLORIDE AND AN ALUMINUM HYDRIDE
Walter Marconi and Alessandro Mazzei, Milan, Marcello de Malde, San Donato Milanese, and Salvatore Cucinella, Milan, Italy, assignors to SNAM S.p.A., a company of Italy
No Drawing. Original application Jan. 29, 1962, Ser. No. 169,621. Divided and this application Aug. 1, 1963, Ser. No. 299,182
Claims priority, application Italy, Feb. 4, 1961, 1,984/61, Patent 647,780; Nov. 21, 1961, 18,075/61, Patent 707,662; Nov. 24, 1961, 21,200/61
4 Claims. (Cl. 260—94.3)

This application is a division of U.S. patent application Ser. No. 169,621, filed Jan. 29, 1962, and now abandoned.

This invention relates to the stereospecific polymerization of isoprene.

The production of those stereospecific polymers of isoprene which are synthetic elastomers is of considerable industrial interest. Particularly interesting is the preparation of those polymers which are substantially of 1,4-cis and 1,4-trans configuration, or in which such a configuration predominates.

Various catalytic systems have been proposed for use in the production of stereospecific polymers of isoprene which are substantially of 1,4-cis or 1,4-trans configuration. Such catalytic systems consist generally of a halide of a transition metal of Groups IV, V or VI of the Periodic Table according to Mendeleieff and an aluminum alkyl.

The object of the present invention is a process for the production of polyisoprene of 1,4 configuration which is essentially stereospecific.

The process of the present invention is based on the use of a catalytic system consisting of:
(a) Titanium tetrachloride,
(b) An aluminum hydride having the general formula $AlH_2X$, wherein X is a member chosen from the group consisting of hydrogen, halogen, aminic nitrogen and nitrogen and nitrogen forming part of an ethero-atom ring.

Such hydrides may be complexed with compounds donors of electrons such as amines, ether, etc.

Examples of such catalysts are:

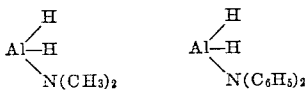
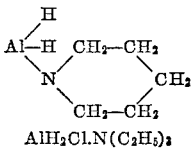

$AlH_2Cl \cdot N(C_2H_5)_3$

Among the complexing agents special advantages have been shown by tertiary amines which possess marked stabilizing properties for aluminum hydrides.

The ratio Al/Ti in the catalytic system has a great importance for the stereospecificity of the reaction. When the ratio is between 0.25 and 1.4, expressed as a ratio between gram atoms of aluminum and titanium, there is obtained prevailingly 1,4 trans polyisoprene.

By increasing the value of the above ratio there occurs a prevailing formation of poly-isoprene 1,4-cis. The optimum value for the formation of 1,4-cis poly-isoprene is 1.5. For higher values of the ratio Al/Ti the yield of 1,4-cis poly-isoprene decreases.

The polymerization is carried out in inert solvent, for example toluene or xylene at ordinary pressure.

The reaction temperature varies between —20° C. and +50° C., preferably between +10° C. and +30° C. The duration of the reaction to obtain polymerization is normally several hours.

The following examples illustrate the nature of the invention.

*Examples 1–6*

In the following examples there is employed a catalyst system for the polymerization of isoprene formed of $AlH_2N(CH_3)_2$ and $TiCl_4$ with various Al/Ti molar ratios.

Into a bottle of 200 ml. capacity previously heated at a free flame and allowed to cool down in a nitrogen stream, there are introduced benzene and the needed amount of $TiCl_4$.

After that charge there is introduced while stirring the needed amount of a benzenic solution at known concentration of dimethyl-amino-alane.

The bottle is sealed with a neoprene seal and a corona type bottle cap which is punched in such a way as to expose part of the neoprene seal.

Then the bottle is held for about 10 minutes over a shaking stirrer at room temperature to complete the reaction between the catalyst components.

Finally isoprene is added by a hypodermic syringe and the bottle is put at once into a rotating thermostatic bath for the desired length of time.

At the end of that period the content of the bottle is discharged into about one litre of methyl alcohol containing 1% of antioxidant.

The precipitated polymer is dried in an oven under vacuum at room temperature, then the yield of polymer is calculated. The conditions of polymerization and the results of the infrared analyses, are reported in the following Table 1.

TABLE 1

| Examples | $AlH_2N(CH_3)_2$, mMoles | $TiCl_4$, mMoles | Molar ratio Al/Ti | Solvent (Benzene), cm.³ | Isoprene, gr. | T., °C. | Duration, hours | Yield, percent | I.R. Analyses, percent ||||  Unsat. Total |
|---|---|---|---|---|---|---|---|---|---|---|---|---|---|
| | | | | | | | | | 1,4 cis | 1,4 trans | 1-2 | 3-4 | |
| 1 | 0.55 | 1.82 | 0.3 | 100 | 18.5 | +15 | 18 | 9.5 | Predominantly 1,4 trans | | | | |
| 2 | 0.91 | 1.82 | 0.5 | 100 | 20.4 | +15 | 18 | 8.4 | Predominantly 1,4 trans | | | | |
| 3 | 1.09 | 1.82 | 0.6 | 100 | 20.4 | +5 | 19 | 47 | 94.6 | 0 | 0.5 | 4.9 | 94 |
| 4 (m) | 1.27 | 1.82 | 0.7 | 100 | 20.4 | +15 | 19 | 76.5 | 95.8 | 0 | 0.4 | 3.8 | 87 |
| 5 | 1.46 | 1.82 | 0.8 | 100 | 20.4 | +15 | 18 | 57.5 | 95.8 | 0 | 0.5 | 3.7 | 86 |
| 6 | 1.82 | 1.82 | 1 | 100 | 20.4 | +15 | 18 | 13.2 | 56.9 | 38.4 | 0.3 | 4.4 | 88 |

(m) Molecular weight in toluene at +30° C.=4.68.10⁵.

Example 7

Diphenyl-amino-alane was prepared by a method analogous to that described in literature for the preparation of diethyl-amino-alane.

We reacted diphenyl amine dissolved in benzene with $AlH_3.N(CH_3)_3$ in molar ratio 1:1 and measuring the hydrogen developed in the reaction.

The solution is evaporated under vacuum and the dry solid substance is weighed. This was reacted with a benzoic solution of $TiCl_4$. The catalyst system employed therefore is $$AlH_2.N(C_6H_5)_2 + TiCl_4$$

The recipe employed in these tests is as follows:
Benzene 100 ml.; $TiCl_4$ 1.82 millimoles; $AlH_2N(C_6H_5)_2$ 1.09 millimoles; Al/Ti molar ratio 0.6:1; isoprene 20.4 g.; polymerization temperature +15° C.

After 16 hours the bottle is opened and the polymer is coagulated with methyl alcohol.

There are obtained 3 g. of gummy polymer which on I.R. analysis showed the following structure: 96.1% 1,4-cis structure; 1,4-trans structure absent; 0.4% 1–2; 3.5% 3–4; total unsaturation=87%.

Example 8

The compound

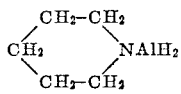

was prepared by reacting a benzenic solution of piperidine with a benzenic solution of $AlH_3.N(CH_3)_3$ in molar ratio 1:1. The hydrogen developed was collected and measured (1 mole). The benzenic solution was evaporated under vacuum to eliminate the solvent and the dry solid is weighed. This is reacted with a benzenic solution of $TiCl_4$. Hence the catalytic system is formed of:

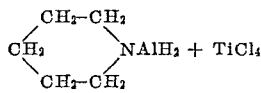

and the recipe is as follows:
Benzene—100 ml.
$TiCl_4$—1.82 millimoles

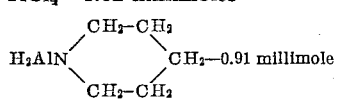

Al/Ti molar ratio—0.5:1
Isoprene—20.4 g.
Polymerization temperature—+15° C.

After 16 hours the content of the bottle is discharged into methyl alcohol and little polymer is obtained having powdery appearance and giving I.R. analysis result of being predominantly 1.4-trans structure.

Example 9

The preceding test is repeated increasing the amount of

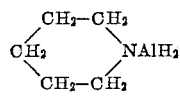

Hence the recipe is as follows:
Benzene—100 ml.
$TiCl_4$—1.82 millimoles

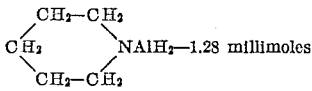

Al/Ti molar ratio—0.7
Isoprene—20.4 g.
Polymerization temperature—+15° C.

After 16 hours the polymer is coagulated, dried and weighed. There are obtained 16.5 g. (81%) of polymer of gummy appearance, which on I.R. analysis shows the following structure: 95.3% 1,4-cis structure; 1,4-trans structure absent; 0.6% 1–2; 4.1%; total unsaturation=88%.

Example 10

Isoprene is polymerized using the catalytic system with the Al/Ti in molar ratios given below.

The quantities employed are:

Benzene—100 ml
Titanium tetrachloride—4.55 millimoles
4 $AlH_3.(C_2H_5)_2O$—1.82 millimoles
and
Isoprene—21 g.
Molar ratio Al/Ti—0.4

A white powdery polymer insoluble in benzene is obtained in 43% yield.

Infrared analysis shows that it is predominantly 1–4 trans polyisoprene.

In a further advantageous aspect the invention comprises the use of hydrides and halohydrides of aluminum complexed with tertiary amines, as cocatalysts. Compounds of this kind are for instance: $AlH_2Cl.N(C_2H_5)_3$.

Examples 11–15

In the following polymerization tests the aluminum hydride complexed with trimethyl amine is replaced by monochloro-aluminum dihydride complexed with triethyl amine. The catalyst system, therefore, is formed of $AlH_2Cl.N(C_2H_5)_3$ and $TiCl_4$.

The catalyst is prepared in bottles as described hereinbefore.

In the following Table 2 are tabulated the conditions of polymerization, the yields of solid polymer and the infrared (I.R.) analyses.

TABLE 2

| Examples | $AlH_2Cl.N(C_2H_5)_3$ mMoles | $TiCl_4$, mMoles | Molar ratio Al/Ti | Solvent (Benzene), cm.³ | Isoprene, gr. | T., °C. | Duration, hours | Yield, percent | I.R. Analyses, percent | | | | Unsat. Total |
|---|---|---|---|---|---|---|---|---|---|---|---|---|---|
| | | | | | | | | | 1,4 cis | 1,4 trans | 1-2 | 3-4 | |
| 11 | 0.91 | 1.82 | 0.5 | 100 | 20.4 | +15 | 64 | 1 | Predominantly 1,4 trans | | | | |
| 12 | 1.09 | 1.82 | 0.6 | 100 | 20.4 | +15 | 40 | 85.5 | 96.3 | 0 | 0.4 | 3.3 | 86 |
| 13 | 1.28 | 1.82 | 0.7 | 100 | 20.4 | +15 | 17 | 63 | 95.1 | 0 | 0.5 | 4.5 | 87 |
| 14 | 1.46 | 1.82 | 0.8 | 100 | 20.4 | +15 | 17 | 34 | 95 | 0 | 0.3 | 4.7 | 90 |
| 15 | 1.64 | 1.82 | 0.9 | 100 | 20.4 | +15 | 64 | 20 | 88.4 | 6.7 | 0.3 | 4.6 | 87 |

(m) Molecular weight in toluene at 30° C.=5,5.10⁵.

Having thus described our invention, what we claim is:

1. A process for the stereospecific polymerization of isoprene in substantially anhydrous conditions in the presence of a catalytic system consisting of titanium tetrachloride and an aluminum compound in which the aluminum compound is an aluminum hydride of the following general formula:

$$AlH_2X$$

wherein X is a member chosen from the group consisting of a halogen, a residue of a secondary amine, and a residue of a piperidine ring.

2. A process for the stereospecific polymerization of isoprene in the presence of a catalytic system consisting of titanium tetrachloride and of an aluminum compound in which the aluminum compound is a hydride of the general formula:

$$AlH_2X.Z$$

wherein X is a halogen, and Z is a complexing agent chosen from the group consisting of amines and ethers.

3. A process according to claim 2 wherein the aluminum compound is:

$$AlH_2Cl.N(C_2H_5)_3$$

4. A process according to claim 1 wherein the aluminum compound is chosen among the group consisting of:

$$AlH_2N(C_6H_5)_2$$
$$AlH_2N(CH_3)_2$$

and

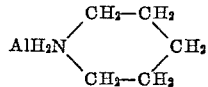

References Cited by the Examiner

UNITED STATES PATENTS

| | | | |
|---|---|---|---|
| 2,921,057 | 1/1960 | Mertzweiller | 260—93.7 |
| 2,977,349 | 3/1961 | Brockway et al. | 260—94.3 |
| 2,979,488 | 4/1961 | Carpenter | 260—94.3 |

FOREIGN PATENTS

| | | |
|---|---|---|
| 799,823 | 8/1958 | Great Britain. |
| 880,998 | 11/1961 | Great Britain. |
| 1,212,108 | 10/1959 | France. |

JOSEPH L. SCHOFER, *Primary Examiner.*

W. HOOVER, E. J. SMITH, *Assistant Examiners.*